Jan. 23, 1940. P. J. A. VANOENACKER 2,188,195
STRAINER FOR VEGETABLES AND FRUITS
Filed March 4, 1937   2 Sheets-Sheet 1

INVENTOR
PAUL JEAN ALFRED
VANOENACKER
ATTORNEY

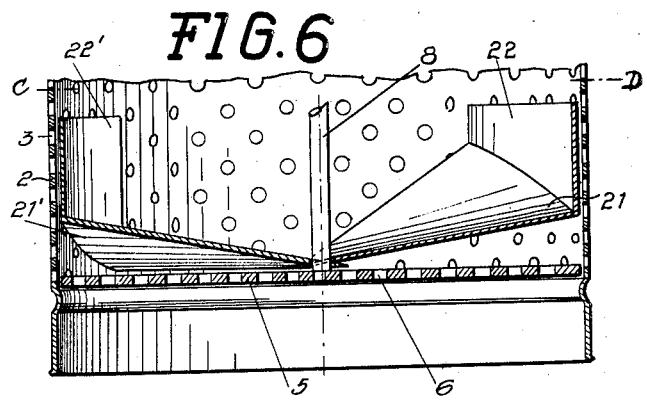
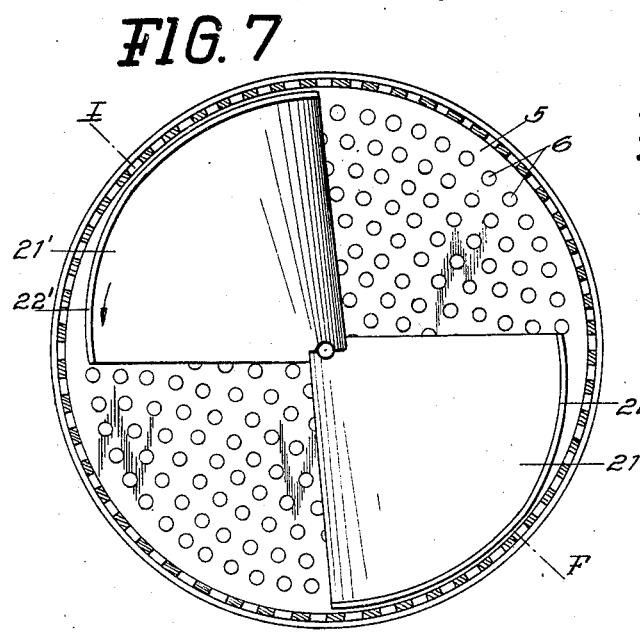
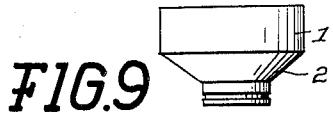
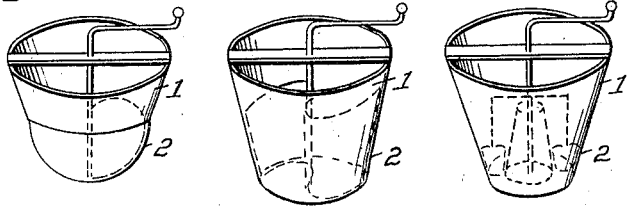
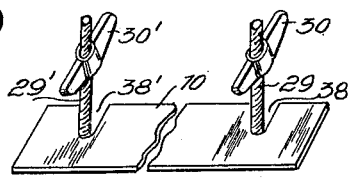
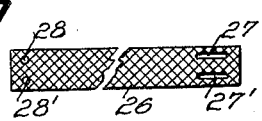

Patented Jan. 23, 1940

2,188,195

UNITED STATES PATENT OFFICE 2,188,195

STRAINER FOR VEGETABLES AND FRUITS

Paul Jean Alfred Vanoenacker, Jemappes, Belgium

Application March 4, 1937, Serial No. 128,955
In Belgium March 12, 1936

1 Claim (Cl. 146—175)

I have filed applications as follows: in Belgium on March 12, 1936, No. 414,340, and its addition on October 31, 1936, No. 418,183; in Germany, on December 16, 1936; in the Grand-Duchy of Luxemburg, on January 18, 1937; in France, on January 18, 1937; in Austria, on February 8, 1937; in Great Britain, on February 15, 1937.

The present invention relates to a strainer for vegetables and fruits, consisting of a reservoir, extending to a space where the crushing operation takes place, this latter space being composed of surfaces in which are perforated holes. The crushing apparatus or mechanism, arranged in relation with the bottom or base, and rubbing simultaneously against the sides and the said bottom or base, is welded to a vertical axis, which may be operated by means of a handle, the axis having its radius in the centre of the base, and in a cross piece which may be moved, and which is attached by means of screws for example, on the upper edge of the strainer.

The crushing apparatus or mechanism is of such a size and form, that the dressed edges come in contact with the interior surface of the lateral wall of the operating space, while the base rubs against the perforated bottom.

More ample details are given in the description which follows, which make it easier to understand the object of the invention.

In the attached drawing there is shown, by way of example, one form of the realisation of the present improvement.

Fig. 6 is an axial section on the line E—F of Fig. 7, on the operating space of a vegetable strainer, showing, by way of a variation, the blade in a spiral form.

Fig. 7 is a horizontal section on the line C—D of Fig. 6.

Fig. 8 shows a cylindrical operating space, whereas the reservoir is in the form of an inverted truncated cone.

Fig. 9 shows the truncated reservoir, over which is a cylindrical part.

Fig. 10 shows the operating or crushing space forming one cylinder with the reservoir.

Fig. 11 shows the vegetable strainer in one single truncated body.

Fig. 12 shows the vegetable strainer formed by a truncated operating or crushing space, over which is a reservoir, which is also truncated.

Fig. 13 is a view in perspective showing the operating or crushing space in a hemispherical form.

Fig. 14 is a view in perspective showing the vertical blades working in an entirely truncated vegetable strainer.

Fig. 15 is a view in perspective of a vegetable strainer, in which there is placed a perforated cone which is destined to increase the rubbing surface, the blades having an appropriate shape.

Fig. 16 is a view in perspective of a cover made of metal webbing, which can be adapted to or fitted over the operating or crushing space.

Fig. 17 is an elevation of a strip of metal webbing, which may be placed round the operating or crushing space.

Fig. 18 is a view in perspective showing one method of fixing the cross piece, by means of winged nuts on the upper edge of the reservoir.

Figure 2:
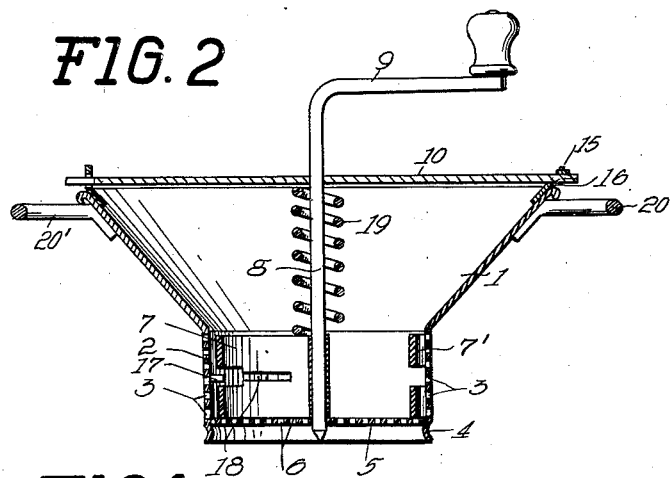
Fig. 2 is a section on the line A—B of Fig. 1.
Figure 1:
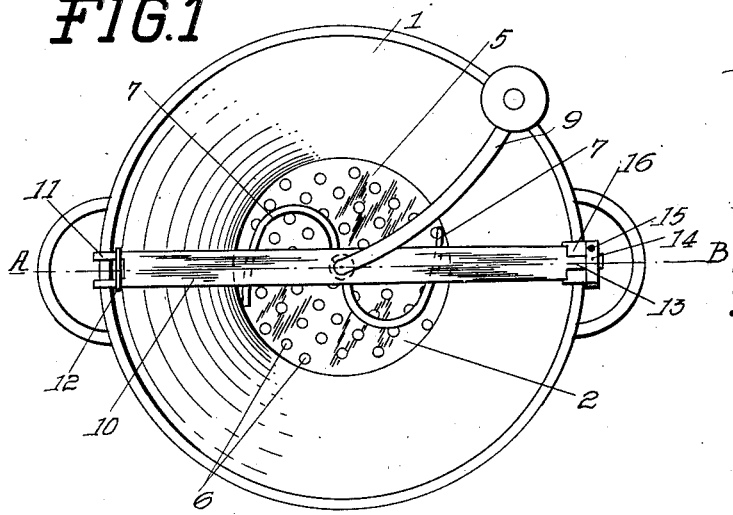
Fig. 1 is a plan of a strainer with vertical crushing blades.

In accordance with Fig. 1 and 2, the vegetable strainer consists of a truncated reservoir 1, forming one piece with an operating or crushing space or chamber 2, which is of cylindrical shape with a wall or partition, perforated with holes 3, the diameter of which may vary according to the use to which the strainer is to be put.

On the lower part of the space of chamber 2, there is a rim 4, which is intended to serve as a support for a circular plate 5 which is perforated with holes 6, and which forms a base.

Two vertical blades 7 and 7' are welded on to an axis 8, in such a way, as to form an S.

The axis 8 may be put in motion in a rotatory manner by means of a handle 9 placed in the brackets, formed by a circular hole arranged for on one hand, in the centre of the base 5, and on the other hand on a movable cross piece 10, which may be attached to the upper edge of the reservoir 1.

The cross-piece 10 is finished off at one end by a fork 11 which is placed under the two arms of a T rod 12, welded to the inside wall of the reservoir 1; the other end of the cross piece finishes in a tongue 13 which may be fitted under a screw 14, which pivots around an axis 15 which is attached to a folded plate 16, also welded to the inside wall of the reservoir, but diametrically in relation to the rod 12.

The curve of the blades varies according to the use to which they are to be put; in the same way, their length may also vary in such a way that a more or less large part works closely against the inside surface of the lateral wall or partition of the operating or crushing chamber; the base of the blades rubs against the perforated base 5 in such a way that the crushing mechanism works simultaneously on the inside surface of the lateral wall and on the base or bottom of the operating or crushing chamber.

In order to prevent the matter rotating with the blades in the operating or crushing chamber, there is provided at least one blade or knife 17, welded to the interior wall or partition of the chamber, which keeps the vegetables in place and thus forces them to be crushed by the blades; but in order to prevent the knife or knives 17 blocking the blades, these latter are fitted with notches 18, which allow the free passage of the aforesaid blades.

It is evident that several blades may be superposed in the form of an S, the space between the said blades in this case, leaving a free passage for the knives to keep the matter to be treated in place.

A spring 19 engaged on the axis 8, and supported on the cross piece 10, obliges the blades to remain in contact with the base, it is evident that the said spring need not necessarily press directly on the blades 7 and 7', but provision can easily be made to this end, for a block of some kind on the axis 8, which will form a seat for the spring.

On the outer surface of the wall of the reservoir, there are fixed, either by rivetting or welding, two handles 20 and 20'.

The height of the blades is approximately that of the convenient height of the operating or crushing chamber.

Figure 3:
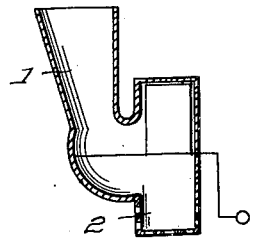
Figs. 3, 4 and 5 show other forms of realisation of the body of the strainer, the axis of the crushing apparatus or mechanism being in a horizontal position.
Figure 4:
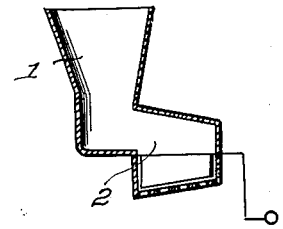
Figure 5:
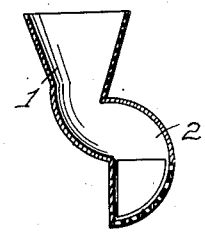

Figures 3, 4 and 5 show a variation of the shape of the vegetable strainer, the axis in this case being horizontal, and the operating or crushing chamber being respectively cylindrical, conical or hemispherical, whilst the reservoir feeds the said chamber through the actual weight of the matter which is found therein.

Figure 6 represents, in a vertical section, the crushing chamber 2 on the line E—F of the Figure 7, and in which two spiral blades 21 and 21', rigidly fixed to the axis 8, may move.

These spiral blades are a variation of the vertical blades, in the sense that they are also straight in relation with the base, but have different angles of ninety degrees, for preference increasing from the point of contact with the base. At the points most distant from the centre, there are provided two rims 22 and 22', either in one piece with the spiral or welded to it; the object of the rims is to work closely against the inside wall of the operating or crushing chamber.

As can be easily seen from Figure 7, these rims 22 and 22' separate a little from the wall of the crushing chamber, at their anterior extremity, in order to gather the matter, to press it, crush it and cause it to pass through the lateral holes.

In Figures 8, 9, 10, 11, and 12, there are shown, by way of example, some forms which the crushing chamber and the reservoir may take.

Figure 13 shows the crushing chamber in a hemispherical shape, the blades in this case being curved to take the shape approximately of the eighth part of a sphere for example. In order to place the vegetable strainer of a hemispherical shape on a flat surface, a crown is provided, welded to the outside of the wall; this crown is not shown.

In Figure 14, the crushing chamber as well as the reservoir are of a conical shape in the extension from one to the other and in such a manner as to have an increasing diameter; this arrangement makes it possible among other things, to place in the inside, blades of a greater height.

According to Figure 15, it is shown that it is possible to increase the crushing surface, by fixing on the inside of the vegetable strainer, a cone 23; in this case, the blades will be conveniently cut out and bent in such a manner as to work in close contact against the partition of the said cone.

On the inside of the crushing chamber 2, and if necessary, on the external surface of the cone 23; there may be provided one or more circular rails 39, fitted with saw teeth 40 either regular or irregular, either continuous or not, conveniently placed so as to prevent the dragging in of the matter. These circular rails may also be placed on the bottom plate of the strainer. In this case, the blades are notched so as to permit of their sliding.

Wings may also be welded on the inside surfaces of the cavity to turn over the matter to be brought towards the interior.

In order to make the matter which has been strained finer, in relation to the holes, a cylindrical envelope made of metal webbing 24 is provided, this to be a diameter slightly larger than that of the crushing chamber, so that it may be slid on to it; this envelope is provided with at least one oblique groove 25, making it possible for a snug to be placed there, this latter being fitted to the outside wall of the crushing chamber, and this maintaining the said envelope in position. In this case, only the base need to be replaced by another, perforated with smaller holes, or even by a solid base.

The metal envelope may also take the form as in Figure 17, that is to say, of a strip of metal webbing 26, having at one extremity two button-holes 27 and 27', in which are placed two snugs 28 and 28', for fixing against the outside wall of the crushing chamber.

Figure 18 shows another method of fixing the cross piece 10; for this purpose, the cross piece has near its extremities, two slots 38 and 38', through which pass the wormed stems 29 and 29', fixed diametrically by welding or other similar means to the upper edge of the reservoir, this tightening being effected by means of the winged nuts 30 and 30'.

Figure 19:
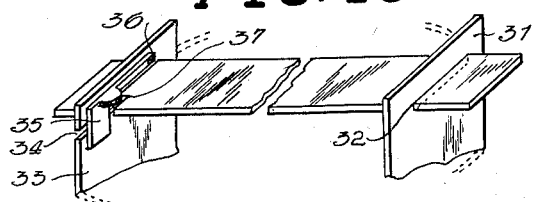
Fig. 19 is a view in perspective, of another method of fixing the cross piece on the reservoir.
Figure 23:
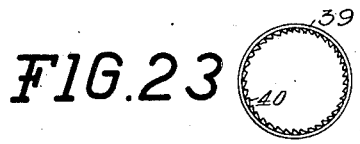
Fig. 23 is a plan of a circular rail fitted with saw-teeth.

The fixing of the cross piece 10 may also be carried out in accordance with Figure 19; on the upper edge of the reservoir there is rigidly fitted a plate 31 provided with an opening 32 into which one of the extremities of the cross piece may be inserted, whilst diametrically opposed, there is fitted in a similar way, a plate 33, with a horizontal slot 34; this latter allows of the passing of the opposite extremity of the cross piece which is kept in position there by a hook 35 pivoting at 36 on this last named plate which, on flanging, is introduced into a groove 37 of the cross piece, thus preventing any movement on the part of the latter.

Figure 20:
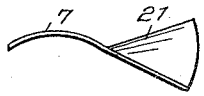
Fig. 20 is a plan of the combination of a vertical blade with a spiral blade.
Figure 21:
Fig. 21 is a plan of two vertical blades.
Figure 22:
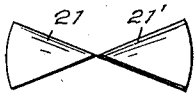
Fig. 22 is a plan of two spiral blades.

In Figure 20, there is shown a combination of two faced blades, one of which is vertical and the other helical, whilst in Figure 21, the crushing mechanism is formed of two vertical blades (see also Figures 1 and 2), and in Figure 22, it is formed of two helical blades.

For preference the number of blades should be two, welded to the rotating axis following a diagonal, although there may be in special cases, a certain number extended around the axis.

The bottom of the crushing chamber is preferably removable, in order to facilitate the cleaning, but it can be easily conceived to be fixed either by stamping or welding for example. The holes in the base, as well as those in the wall of the crushing chamber may be either clean or punched, trimmed like a rasp, or may take any other form.

The invention has been described and illustrated from a purely indicative point of view, and is not in any way limited, and it is evident that several modifications may be brought about in it without departing from the scope of the invention.

I claim:

A strainer for vegetables and fruits, having a receptacle with perforated bottom and perforated vertical cylindrical walls, a rotatable crushing member mounted concentrically in said receptacle and comprising several blades in the form of propeller and acting on the bottom of the said receptacle, said blades being provided, at their exterior side, near the wall of the receptacle, with a ledge standing vertically, the distance between the ledge and the wall of the receptacle increasing in the direction of rotation of the crushing member and means for rotating the crushing member.

PAUL JEAN ALFRED VANOENACKER.